Aug. 30, 1932.  C. O. YOUNCE  1,874,731

PISTON RING COMPRESSING TOOL

Filed June 2, 1931

INVENTOR.
Clarence O. Younce

BY Lancaster, Allwine and Rommel
ATTORNEYS.

Patented Aug. 30, 1932

1,874,731

UNITED STATES PATENT OFFICE

CLARENCE O. YOUNCE, OF TACOMA, WASHINGTON

PISTON RING COMPRESSING TOOL

Application filed June 2, 1931. Serial No. 541,705.

This invention relates to improvements in piston ring compressing tools.

The primary object of this invention is the provision of an improved piston ring compressing tool which may be readily utilized for compressing the piston rings upon the piston of a motor, without disassembling the piston from its connection with a crank shaft, in such manner that the piston may be readily slipped into close fitting relation in the cylinder without interference upon the part of the ring.

A further object of this invention is the provision of an improved piston ring compressor of a relatively compact and efficiently operated construction which may be adjusted to fixedly clamp the piston ring in a compressed relation upon its piston without the necessity of manually maintaining the compressing action.

Other objects and advantages of this invention will be apparent during the course of the following detailed description.

In the accompanying drawing, forming a part of this specification, and wherein similar reference characters designate corresponding parts throughout the several views, Figure 1 is an elevation of the improved piston ring compressor, showing it in its extended relation.

Figure 1:
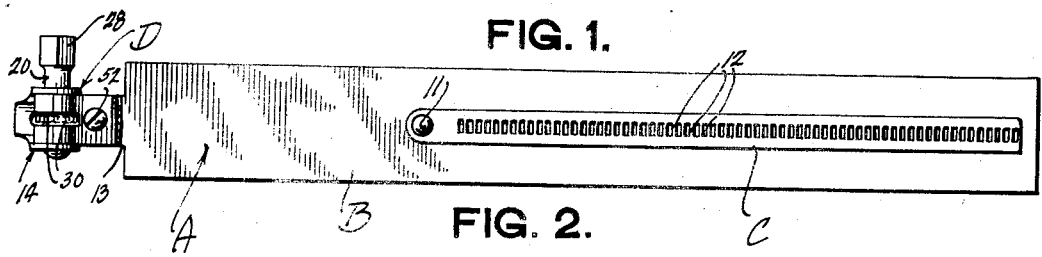
Figure 2:
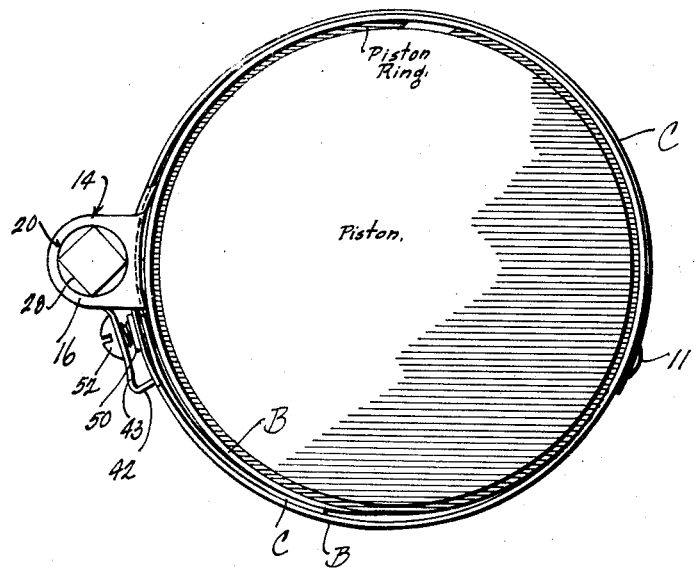
Figure 2 is a plan view of the piston ring compressor showing it in its operating position upon the piston.

In the drawing, wherein for the purpose of illustration is shown only a preferred embodiment of the invention, the letter A may generally designate the improved piston ring compressor, which may consist of a flexible metallic strap B having exteriorly disposed thereon a rack C and provided at an end thereof with pinion means D for intermeshing with the rack C in order to contract or expand the band B.

The band B is preferably of flexible steel and in length it will be greater than the circumference of any piston which it is adapted to encircle for the purpose of compressing the piston ring. It is relatively wide and on the outer surface thereof it is provided with a narrower flexible steel rack strap C which is permanently riveted or otherwise anchored at 11 at one end to the intermediate portion of the band or strap D; the rivet 11 on the inner surface of the band or strap B being machined flush with the inner surface or periphery of said strap. The rack strap C extends loosely along the outer surface of the strap or band B and at its opposite end it is free of connection with the band B. It is provided with uniformly spaced recesses 12 therein throughout its length. The body strap B at its end opposite the end upon which the rack strap C is positioned is transversely reduced. This reduced end designated by numeral 13 is flexible and doubled upon itself for a purpose to be subsequently described, in cooperation with the operating means D.

Figure 5:
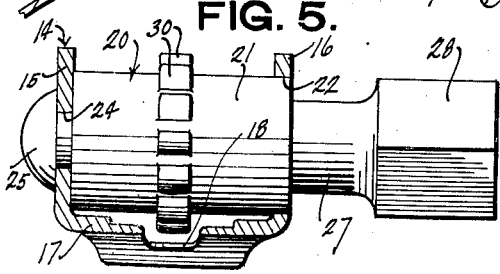
Figure 5 is a sectional view taken axially of the operating pinion showing the mounting frame thereof in section.

The operating means D preferably includes a substantially U-shaped bracket 14 provided with parallel supports or frame portions 15 and 16 and a bight or base portion 17. The latter may be arcuated and provided with a central opening 18. The bracket 14 rotatably supports the pinion 20 which includes a cylindrical shaped body 21 bearing at one end in an opening 22 in the frame portion 16, and at its opposite end the body 21 has a bearing in an opening 24 in the portion 15 of the frame 14; the pinion being riveted at 25 at the outer side of the frame portion 15 to prevent transverse disconnection of said pinion from the frame 14, as will be obvious from Figure 5 of the drawing. The pinion 20 transverse to and beyond the frame portion 16 is reduced at 27 and provided with a wrench engaging head 28. The pinion 20 is of course rotatable in the frame and it is provided with an annular series of teeth 30, and it is to clear these teeth that the base 17 of the frame 14 is apertured at 18.

Figures 3, 4:
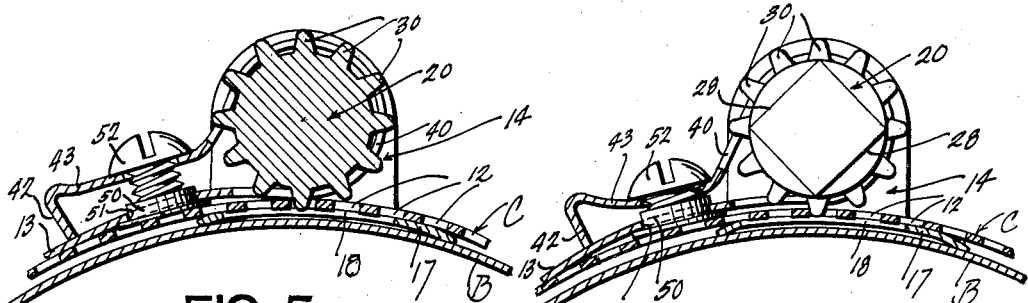
Figure 3 is an enlarged sectional view at the contracting portion of the device, showing more particularly the inter-engagement of an operating pinion with a rack and the associated parts.
Figure 4 is a view somewhat similar to Figure 3, but showing the manner in which the device is clamped into a set piston ring compressing position.

The reduced end 13 of the body strap B is provided with a longitudinal slot 40 therealong. In the assemblage of the bracket 14 upon the body strap B the reduced end 13 is slipped through the space between the base 17 of the bracket 14 and the pinion 20 and looped about the pinion; the teeth 30 projecting through the slot 40 as shown in Figure 3 of the drawing. The free end of the loop thus provided is bent at 42 normal to the adjacent length 43 of the loop, so that the extreme free edge of this portion 42 engages the outer surface of the reduced portion 13 adjacent its connection with the body strap B, as shown in Figure 3 of the drawing. This positions the portion 43 in spaced parallelism with the reduced end 13 adjacent the connection of the latter with the body strap B, as shown in Figure 3 of the drawing. This encircles the loop about the pinion 20 at opposite sides of the pinion as can readily be understood. A nut 50 is assembled in an opening 51 in the portion of the reduced end 13 adjacent to the body strap B. It has a screw threaded opening therein wherein the screw threaded shank of a screw 52 is adjustable; the latter being carried by and extended rotatably through an opening in the portion 43 of the loop. It is obvious that the screw 52 incident to the positive engagement of the nut 50 with the strap portion 13 will hold the loop formation for the support of the bracket 14 and the rotatably mounting of the pinion 20, as shown in Figure 3 of the drawing. Merely by adjusting the screw 52 in its nut 50 it is quite apparent that the loop may be clamped tightly upon the pinion 20 and preventing its rotation in the upright supports of the bracket 14.

In the use of the device the end of the strap B opposite the pinion is passed along the inner side of the base 17 of the bracket 14 and the free end of the rack C is inserted between the pinion teeth and the base 17, as shown in Figure 3. The rotation of the pinion will mesh the teeth with the openings in the rack and the band B may be expanded or contracted at will, as is obvious. It is quite apparent from this arrangement that there will be a smooth inner peripheral surface for engagement with the piston ring to be contracted, since obviously the rack element C does not in itself clamp upon the piston ring, but merely serves with the pinion and its bracket in tightening the strap B per se about the piston ring.

By tightening the strap screw 52 it is quite apparent that the pinion may be set at any desired location upon the rack C for holding a piston ring contracted upon a piston, so that the operator may expend his manual effort elsewhere in assembling the piston in the cylinder or in performing other operations. It is also apparent that an improved arrangement has been provided wherein the rack supporting end of the strap B slips and operates at the inner periphery of the opposite end of the strap B.

Various changes in the shape, size, and arrangement of parts may be made to the form of invention herein shown and described, without departing from the spirit of the invention or the scope of the claims.

I claim:

1. In a piston ring compressing device the combination of a flexible steel band adapted to have the ends overlapped in a circle providing relation, a pinion shaft, one end of said band being looped about said shaft to provide a bearing for rotatably supporting said shaft on an axis transverse to the plane of the circle provided by said band, rack means on the other end of said band for engagement with said pinion to contract or expand the band, and adjusting means for clamping the band loop upon said shaft to hold the shaft against rotation.

2. In a piston ring compressing tool the combination of a flexible steel band having one end thereof reduced and provided with a slot longitudinally therein, said reduced end being doubled upon itself in a loop providing relation, means for contracting or expanding said loop, a shaft transversely bearing in said loop and rotatable therein, said last mentioned means upon adjustment being adapted to clamp said shaft against rotation, pinion teeth upon the shaft extending through said slot, and a rack element carried by the band at its opposite end and engageable by said teeth to contract or expand the band.

3. In a piston ring compressing tool the combination of a flexible steel band having one end thereof reduced and provided with a slot longitudinally therein, said reduced end being doubled upon itself in a loop providing relation, means for contracting or expanding said loop, a shaft transversely bearing in said loop and rotatable therein, said last mentioned means upon adjustment being adapted to clamp said shaft against rotation, pinion teeth upon the shaft extending through said slot, and a flexible rack element mounted upon the exterior of the band intermediate the ends of the band, said rack element extending in the direction of the end of the band opposite the end on which the pinion shaft is mounted and at its free end being free of connection with the band, said rack upon looping the band being positioned to be engaged by the teeth of the pinion shaft upon rotation of the latter to expand or contract the band.

4. In a piston ring compressing tool the combination of a flexible elongated band adapted to have its ends overlapped in a circle providing relation, a substantially U-shaped bracket including a base and outstanding supports, a shaft rotatable upon said supports between said supports having a series of pinion teeth circumferentially thereabout, said base of the U-shaped bracket having an opening therethrough into which the teeth of the pinion extend during rotation, means mounting said bracket at one end of the flexible shaft, and a flexible rack member having a series of uniformly spaced openings therein at the opposite end of said band of a size to permit the rack to be inserted between the shaft and the base in position to engage the teeth of the shaft in said openings of the rack for moving the rack back and forth upon rotation of the shaft whereby to expand or contract the circular size of said band.

5. In a piston ring compressing tool the combination of a flexible elongated band adapted to have its ends overlapped in a circle providing relation, a substantially U-shaped bracket including a base and outstanding supports, a shaft rotatable upon said supports, and between said supports having a series of pinion teeth circumferentially thereabout, said base of the U-shaped bracket having an opening therethrough into which the teeth of the pinion extend during rotation, means mounting said bracket at one end of the flexible shaft, a flexible rack member having a series of uniformly spaced openings therein at the opposite end of said band of a size to permit the rack to be inserted between the shaft and the base in position to engage the teeth of the shaft in said openings of the rack for moving the rack back and forth upon rotation of the shaft whereby to expand or contract the circular size of said band, and means to clamp said shaft against rotation.

CLARENCE O. YOUNCE.